Jan. 8, 1952   C. R. MOORE   2,582,146
APPARATUS FOR MEASURING WATER POWER
Filed Nov. 22, 1947
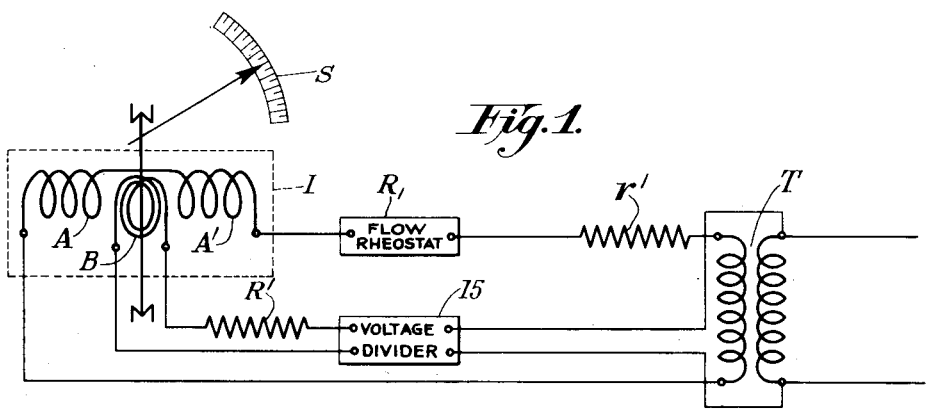
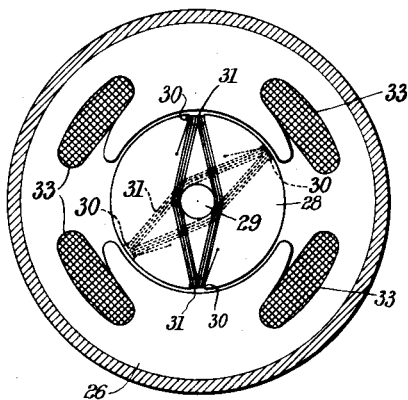
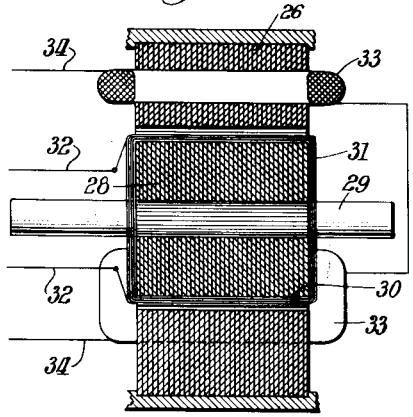
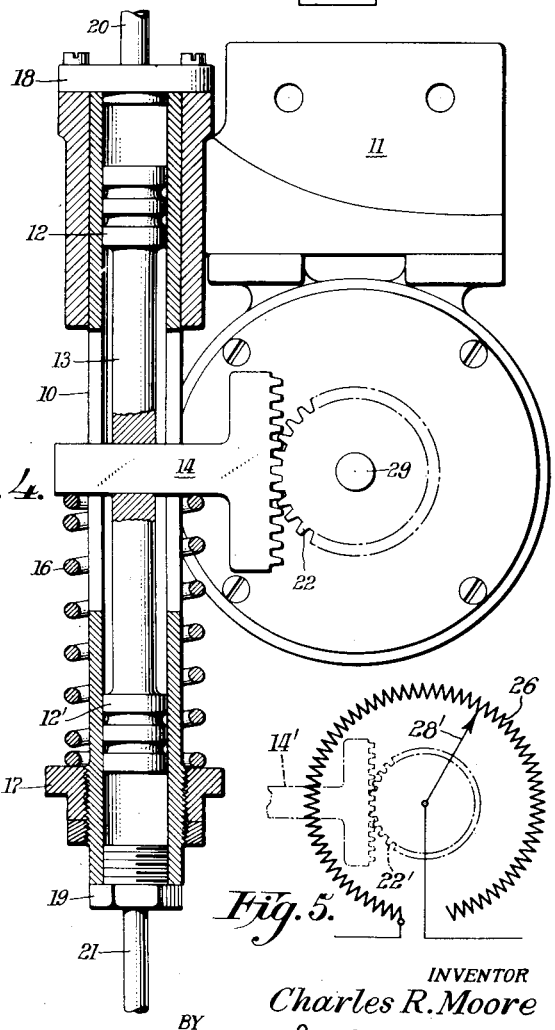
INVENTOR
Charles R. Moore
BY
AGENT Patented Jan. 8, 1952

2,582,146

UNITED STATES PATENT OFFICE 2,582,146

APPARATUS FOR MEASURING WATER POWER

Charles R. Moore, Millburn, N. J., assignor to Marlow Pumps, Incorporated, Ridgewood, N. J., a corporation of New Jersey Application November 22, 1947, Serial No. 787,526

2 Claims. (Cl. 73—133)

This invention relates to improvements in apparatus for measuring water power, and in particular to the provision of means whereby water horsepower may be determined without resorting to slow, time consuming mathematical calculations.

When a liquid is pumped against a head or pressure energy is stored in the liquid so pumped. If this be done in a given time the effect may be expressed in terms of power based on flow and pressure. While known apparatus may be employed to obtain an indication of the flow of a fluid through a pipe or conduit and known instruments are likewise designed to give the pressure head of fluid; and, based on readings of flow and pressure, we may calculate water horsepower according to formula, no suitable means is to my knowledge available to obtain direct power readings during pumping.

This invention has for its principal object the provision of instantaneous and accurate indications or recordings of water horsepower over a useful range of values. In the preferred embodiment of the invention I employ an electrical indicating type of instrument, the operation of which is based on the use of two electrical currents which react upon each other so that an indication is given which is proportional to their product. In one portion of the apparatus of my invention associated with this instrument one electric current is caused to flow, the effect of which is proportional to the flow of liquid in a conduit. In another portion of my apparatus the second electric current is caused to flow, the effect of which is proportional to the total pressure (head) developed. Whether the instrument be merely an indicating instrument as proposed or whether it is a recording instrument will depend upon the conditions of the application.

Direct or alternating current may be used in the embodiment of my invention although there are certain advantages obtainable in the use of alternating current which are not apparent with the use of direct current. For example, with alternating current, better control of operating voltage is obtained and voltage division may be had without sliding contacts. Likewise, commercial current transformers may be used to modify the range of horsepower indication. Furthermore, alternating current proportional to liquid flow can be obtained from commercially available flow meters operating on alternating current, and the indicating or recording meter is of simpler construction since single winding potential and current coils must be used. The sole disadvantage of using alternating current, by comparison with direct current, resides in the fact that the flow current is zero until a definite flow obtains. This means that the meter as a whole will not measure power below a fixed minimum. All presently available flow meters operating on alternating current have such a suppressed zero; nevertheless, they are largely used. If resistances are used the pressure circuit will also have a suppressed zero, but an inductive device may be used which has a true zero.

My invention will be more fully understood by reference to the accompanying drawings which form a part of this specification and which illustrate a preferred embodiment thereof. It will be understood that changes may be made in the apparatus described and the method of its operation which are within the scope of the subjoined claims.

In the drawings,

Figure 1 is a schematic electrical diagram to illustrate the arrangement of the apparatus of my invention, Figures 2 and 3 are plan and side elevation views of essential details of a voltage divider employed as an element of the apparatus of my invention, Figure 4 is a cross-sectioned elevation view taken through a fluid pressure responsive device used with my invention, showing its association with the voltage dividing apparatus for alternating current, and Figure 5 is a fragmentary schematic view showing apparatus substituted for the voltage dividing apparatus when using direct current.

An electrical indicating device is provided according to a preferred embodiment of my invention which will indicate water horsepower directly according to the formula—

$$\text{Water H P} = \frac{w.H}{K}$$

where;

$w$ = the average quantity of liquid moved during a unit of time or flow $H$ = the total pressure head (delivery plus suction head)

$K$ = a constant appropriate to units used

The well known equivalent for water horsepower is 3960 gallons per minute $\times$ one foot head.

A schematic electrical circuit for alternating current apparatus covering the above requirements is shown in Figure 1, where the broken line rectangle includes essentials of that part of the circuit contained in the indicating instrument I. Coils A and A' in the instrument are stationary and coil B is mounted on a pivoted element which, in turn, co-acts with other suitable mechanical devices to provide a reading of water horsepower at scale S. This arrangement is somewhat analogous to that of an electrical watt meter wherein a stationary coil develops a magnetic field to be reacted upon by currents in a moving coil.

We may assume that the current flowing in the circuit of the stationary coils, which we shall term circuit 1, will be directly proportional to the rate of flow of liquid in a conduit leading from a liquid pumping device and that the current in the circuit of the movable coil termed circuit 2 will be directly proportional to pressure head. Resistances R' and r' are fixed in value when initial settings are determined for the value of current at which the circuits begin to function. A constant voltage appropriate to the conditions of the design of the apparatus is introduced into the circuits, transformer T being used to reduce the potential of the alternating current supply for circuit 1 to a suitable value.

The closure of circuit 1 during flow of liquid will cause current to flow in the instrument coils A—A' in that circuit. For the condition of zero liquid flow there will be no connection through the stationary coil circuit and the instrument will read zero regardless of pressure. For the condition of zero pressure, no magnetic field is established in coil B and the meter will read zero regardless of flow. For conditions of combined flow and pressure the instrument indications will be proportional to the product of the magnetic effect produced in coils A, A' and the magnetic effect produced in coil B, and indication will therefore be proportional to the water horsepower developed.

Appropriate apparatus is provided to regulate the current flowing in circuit 1 so that it will be proportional to the rate of fluid flow or to the volume of fluid passing through a given conduit. This apparatus may take the form of an electrical flow meter constructed according to U. S. Patent No. 1,325,763 to Spitzglass and actuated from a Pitot tube or other known means for transmitting a pressure difference created by the flow of fluid in a conduit. Pressure taken from the fluid flow is directed to the apparatus to vary the position of a mercury column U-tube. As the level of mercury in one leg of the U-tube rises, and after a minimum flow obtains, the mercury will close a series of spaced contacts thus inserting resistances in the circuit which are proportional to the square root of the contact spacing. According to the teachings of the patent aforementioned, the current flowing will be directly proportional to the flow of fluid in the conduit. This apparatus, in the schematic diagram of Figure 1 is represented as flow rheostat $R_1$.

The current flowing in the potential circuit 2, which produces a magnetic effect at coil B proportional to the total pressure head is obtained from a voltage divider 15, parts of which are illustrated in Figures 2 and 3, and actuated by mechanism as shown in Figure 4 associated with the hydraulic system. In the latter view an elongated hollow metal cylinder 10 securely fastened to a supporting bracket 11, which also supports voltage divider 15, contains a pair of small spaced pistons 12, 12' slidable therein and suitably constructed to be in sealing engagement with the inner walls of the cylinder. Between pistons 12 and 12' is a metal connecting rod 13 which may be integral with the pistons, and suitably fixed thereto at right angles therewith is a flat rack arm 14 which actuates the voltage divider 15. Provision is made for arm 14 to move up and down with respect to cylinder 10 by slotting opposite sides of the cylinder intermediate of the operating limits of pistons 12 and 12'. Rack arm 14 is normally restrained at the upper limit of its travel by a compression spring 16 which surrounds the lower portion of cylinder 10 interposed between the rack arm and an annular abutment member 17 threadedly fastened and locked at the end of the cylinder.

An hermetically sealed closure for the top of cylinder 10 is effected by a removable cap 18 fastened to bracket 11 and likewise, the lower end of cylinder 10 is closed by means of a removable bushing 19 threaded to the internal surface thereof. Delivery pressure from a pump or other device in the system reaches the upper internal cylindrical space above piston 12 through a tube 20 extending through closure 18, and suction pressure is directed into the cylinder below piston 12' through closure 19 by a tube 21. Thus, the total pressure head will tend to move pistons 12, 12' downwardly against the pressure of spring 16 which will, in turn, cause the rack arm 14 to move downwardly and turn the gear wheel 22 on the shaft of the voltage divider 15 to an extent which is directly proportional to the combined delivery plus suction head.

The voltage divider 15, as illustrated in detail in Figures 2 and 3, comprises a laminated field structure 26 similar to that used in universal motors having two poles and forming a small but uniform air gap around a rotatable member 28 fitted to shaft 29. Rotatable member 28 is also laminated and two small diametrically opposed slots 30 are provided thereon. A single coil of fine wire 31 is wound in these slots and flexible leads 32 brought out therefrom. No slip rings are necessary since the rotatable member is moved only a total angular distance equal only to one-half of that of the pole face.

Field structure 26 is excited by field coils 33 connected by leads 34 to an alternating current constant potential source. Since the air gap around rotatable member 28 is small and uniform the flux density required should be a constant average value over the area of the pole face and therefore, for the position of the coil 31 as shown in the full lines of Figure 2, zero voltage is induced in it since no flux threads the coil. When moved to the dotted position maximum voltage is induced since practically all of the pole face flux threads the coil. The air gap being uniform it is evident that equal angles of movement will produce equal increments of voltage in the coil. If, therefore, the rack and pinion of Figure 4 be used to transfer motion directly proportional to the delivery plus suction head to the rotatable member 28 through shaft 29, then equal increments of pressure will produce equal increments of voltage in circuit 2. In Figure 1 this apparatus is represented as the pressure responsive voltage divider 15.

For direct current operation, a pressure actuated rheostat 15', Figure 5, may be substituted in the line in circuit 2 for the voltage divider 15 used with alternating current. This sliding contact device 15' may also be used with alternating current although the divider 15 is preferable for that application. Rheostat 15' is suitably constructed to vary the flow of current in this circuit in direct proportion to the total pressure head. Accordingly, and using the mechanical devices of Figure 4 to obtain motion proportional to pressure, rack arm 14' will turn gear wheel 22', to which is suitably fastened a sliding contactor member 23' which, as it moves, will progressively change the resistance in the circuit. As the total pressure increases an appropriate amount of resistance 26' will be cut out which will increase the current flowing in the moving coil B of instrument I to give an increased water horsepower indication on scale S for a given condition of flow.

It will be understood that the drawing and description presented are illustrative and that various substitutions and changes may be made in the precise physical embodiment of the invention without departing from the scope of the subjoined claims.

I claim:

1. In a measuring instrument for obtaining direct readings of water horsepower, in combination, an electric watt-meter element including a stationary coil and a movable coil in mutual co-acting relationship, a dial indicator to measure deflection between the stationary coil and the movable coil, an electrical circuit for the stationary coil, a second electrical circuit for the movable coil, a variable resistance flow rheostat in the first circuit to control current in the stationary coil proportional to the flow of liquid in a conduit, hydraulic cylinder and piston means adapted to a pumping system to effect translatory movement proportional to the combined delivery plus suction head in the system, and a voltage divider in the electrical circuit of the movable coil driven by said hydraulic cylinder and piston means to vary the voltage in the circuit, whereby net magnetic effect introduced in the coils may be converted to relative positioning of the coils to give direct indications of water horsepower on the dial indicator.

2. In a measuring instrument for obtaining direct readings of water horsepower, in combination, an electric watt-meter element including a stationary coil and a movable coil in mutual co-acting relationship, a dial indicator to measure deflection between the stationary coil and the movable coil, an electrical circuit for the stationary coil, second electrical circuit for the movable coil, a variable resistance flow rheostat in the first circuit to control current in the stationary coil proportional to the flow of liquid in a conduit, hydraulic cylinder and piston means adapted to a pumping system to effect translatory movement proportional to the combined delivery plus suction head in the system, spring means to retain said hydraulic means at a prescribed zero position, and a voltage divider driven by said hydraulic cylinder and piston means and located in the electrical circuit of the movable coil to vary voltage in the circuit, whereby the net magnetic effect introduced in the coils may be converted to relative positioning of the coils for indications of water horsepower on said dial indicator.

CHARLES R. MOORE.

REFERENCES CITED

The following references are of record in the file of this patent:

UNITED STATES PATENTS

| Number | Name | Date |
| --- | --- | --- |
| 1,545,752 | Freeman | July 14, 1925 |
| 1,638,101 | Roucka | Aug. 9, 1927 |
| 1,807,530 | Highfield | May 26, 1931 |
| 1,891,155 | Harrison | Dec. 13, 1932 |
| 2,265,787 | White | Dec. 9, 1941 |
| 2,357,921 | Xenis et al. | Sept. 12, 1944 |